Sept. 22, 1964

W. J. NELLEN 3,150,069

FLUID TREATMENT

Filed Feb. 17, 1961

INVENTOR.
WILLIAM JOSEPH NELLEN
BY
William A. Drucker

Sept. 22, 1964 W. J. NELLEN 3,150,069
FLUID TREATMENT
Filed Feb. 17, 1961 3 Sheets-Sheet 3

INVENTOR
WILLIAM JOSEPH NELLEN
BY
ATTORNEY

United States Patent Office 3,150,069
Patented Sept. 22, 1964

3,150,069
FLUID TREATMENT
William Joseph Nellen, Greenwich, Conn., assignor to
The American Machine & Foundry Company, a corporation of New Jersey
Filed Feb. 17, 1961, Ser. No. 90,024
13 Claims. (Cl. 204—301)

This application is a continuation-in-part of copending Serial No. 72,196, filed November 28, 1960.

This invention relates in general to fluid treatment devices and, more particularly, to dialysis and electrodialysis stack construction.

An object of this invention is to provide a dialysis or an electrodialysis stack construction in which the membranes have at least one unsecured edge.

Another object of this invention is to provide an electrodialysis stack in which the membranes define relatively long flow paths and in which the membranes have at least one unsecured edge so that they may more easily move to compensate for pressure differences between the membranes.

A further object of this invention is to provide an electrodialysis stack which is less expensive to manufacture in that those portions of the stack about the effective areas of the membranes need not be made completely water tight.

Yet another object of this invention is to provide an electrodialysis stack which is easier to maintain in that completely assembled electrodialysis stack elements may be removed from and replaced within a fluid-tight container.

A still further object of this invention is to provide an electrodialysis stack construction which permits relatively long fluid flow paths and uses two electrodes, one of which may be very small.

Still another object of this invention is to provide an electrodialysis stack which may operate on city water pressure with less likelihood of this relatively high pressure rupturing the membranes.

Many other objects, advantages and features of invention reside in the construction, arrangement and combination of parts involved in the embodiments of the invention and its practice as will be understood from the following descriptions and accompanying drawing wherein.

Figure 1:
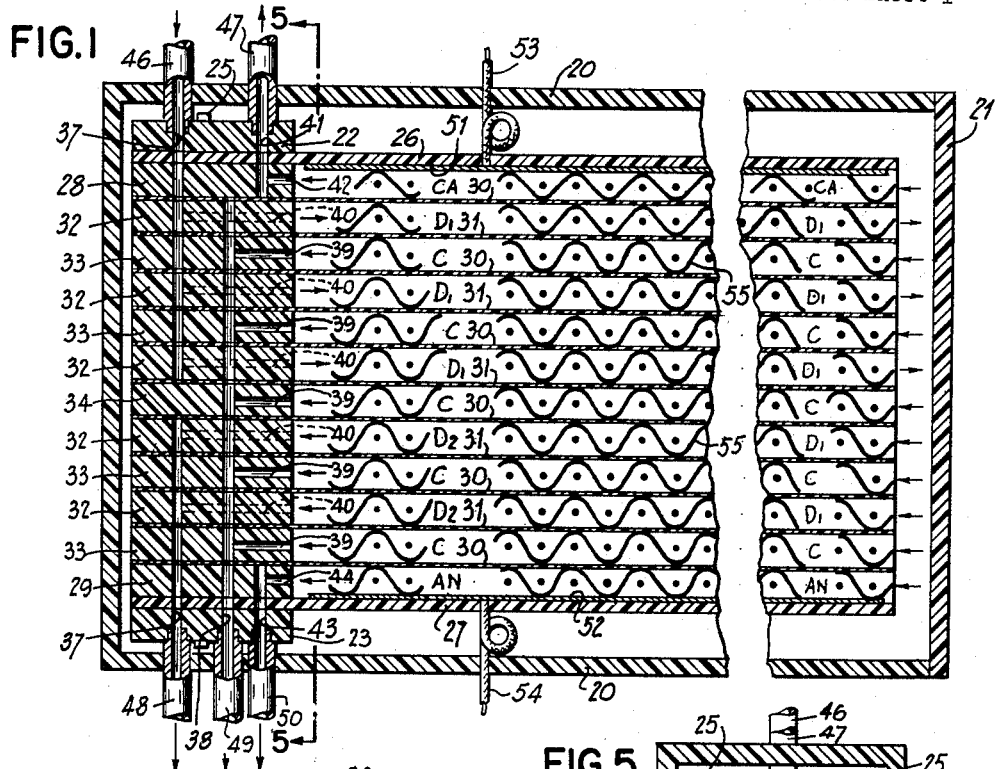
FIG. 1 is a longitudinal vertical section through an electrodialysis stack constructed according to this invention with only fragments of the screen spacers shown between the membranes and with a long central portion broken away.
Figure 2:
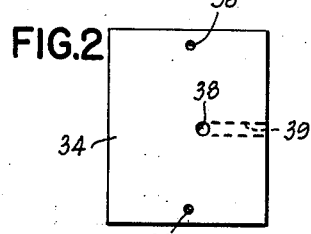
FIG. 2 is a top view of the single blocking gasket used in the assembly of the electrodialysis stack.

Referring to the drawing in detail, FIGS. 1 and 2 show the elongated rectangular container 20 which has the end plate 21 fixed over one end. Within container 20 there are disposed the two end blocks 22 and 23 which are clamped together by means of the bolts 25. Adjacent to the upper and lower end blocks 22 and 23 are the plastic end plates 26 and 27 which extend beyond end blocks 22 and 23 for substantially the length of tank 20.

Next to the end plates 26 and 27 there are disposed the electrode compartment forming gaskets 28 and 29. Between the gaskets 28 and 29 there are alternately placed the cation permeable membranes 30 and the anion permeable membranes 31. Alternately interspersed between the membranes 30 and 31 are the gaskets 32 and 33. One centrally disposed gasket 33 is replaced by a single blocking gasket 34.

Figure 3:
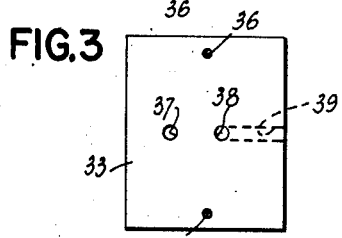
FIG. 3 is a top view of one type of gasket used in the assembly of the electrodialysis stacks.
Figure 4:
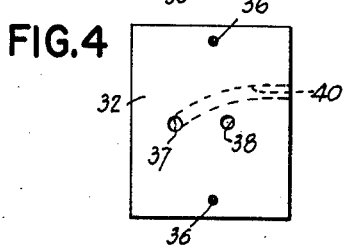
FIG. 4 is a top view of another type of gasket used in the assembly of the electrodialysis stack.
Figure 6:
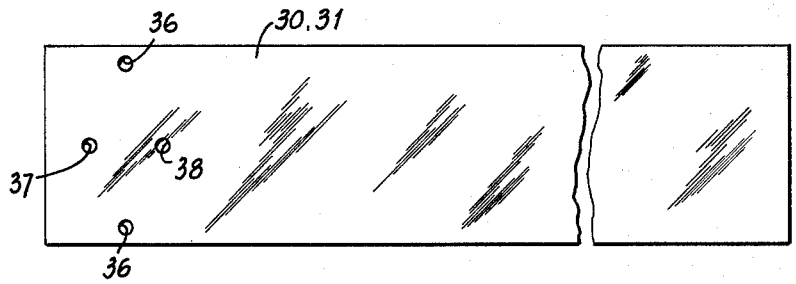
FIG. 6 is a top view with a central portion broken away of a membrane used in the assembly of the electrodialysis stack.

Referring now to FIGS. 2, 3 and 4, it may be seen that each gasket 32, 33 and 34 is a rectangle containing two alignment apertures 36 through which the bolts 25 pass. In addition, the gaskets 32 and 33 each contain the fluid flow manifold apertures 37 and 38 while blocking gasket 34 contains only the fluid flow manifold aperture 38 and does not contain aperture 37. Gaskets 33 and 34 each contain an internally formed fluid flow aperture 39 which communicates between the manifold aperture 38 and one side of the gasket. Each gasket 32 contains an internal fluid flow aperture 40 which communicates between the manifold aperture 37 and the front face of gasket 32. Referring now to FIG. 6, it may be seen that the membranes 30 and 31 also contain the alignment apertures 36 and the fluid flow manifold apertures 37 and 38.

Referring again to FIG. 1, it may be seen that the electrode compartment forming gasket 28, the end plate 26, and the end block 22 also contain fluid flow manifold apertures 37 which are aligned with each other and with the manifold apertures 37 in the membranes 30 and 31 and the gaskets 32 and 33. The end block 22, the end plate 26 and the electrode compartment forming gasket 28 also each contain aligned fluid flow apertures 41. The electrode compartment forming gasket 28 contains an internal fluid flow passage 42 which communicates from the front surface of gasket 28 to passage 41. Electrode forming gasket 29, end plate 27 and end block 23 each contain aligned fluid flow manifold apertures 37 and 38. In addition, they contain the aligned fluid flow apertures 43. The electrode compartment forming gasket 29 also contains an internal fluid flow passage or channel 44 which communicates between aperture 43 and the front face of gasket 29.

Referring further to FIG. 1, a tube 46 passes through the top wall of container 20 to communicate with the manifold aperture 37 formed in end block 22. Tube 47 also passes through the upper wall of container 20 to communicate with manifold aperture 41 in end block 22. In a like manner, the tubes 48, 49 and 50 pass through a lower wall of container 20 to communicate respectively with the fluid flow apertures 37, 38 and 43 in the end block 23.

Fixed to the insides of the end plates 26 and 27 beyond the forwardly disposed edges of the electrode compartment forming gaskets 28 and 29 are the electrodes 51 and 52. The lead 53 extends from electrode 51 through end plate 26 and a wall of container 20. In a like manner, lead 54 extends through end plate 27 and a lower wall of container 20.

As is further shown in FIG. 1, the screen spacers 55 would be disposed between adjacent membranes beyond the edges of the gaskets 32, 33 and 34. These screen spacers 55 would extend along the membranes 30 and 31 for their entire unsupported length, but only fragments of these screens 55 are shown in FIG. 1 and the remainder of the screens 55 is omitted for the sake of clarity. While one type of gasket has been shown and described securing the ends of membranes 30 and 31, any other type of gasket structure could be used.

This first embodiment of the invention operates as follows: Referring to FIG. 1, the leads 53 and 54 are connected to a suitable source of electric current so that electrode 51 functions as a cathode and electrode 52 functions as an anode. Fluid to be treated is then introduced into tube 46 from which it enters the aligned manifold apertures 37. The blocking gasket 34 closes the lower end of the upper portion of the aligned fluid flow apertures 37 so that fluid flowing from tube 46 flows between adjacent membranes from the fluid flow apertures 40. This fluid flows between adjacent membranes for the entire length of the stack and these cells, labeled D1 in FIG. 1, serve as diluting cells. After this fluid flows from the cells D1 beyond the ends of membranes 30 and 31 into container 20, this fluid can only flow from the container 20 by flowing between other adjacent pairs of membranes.

The fluid which flows between the uppermost membrane 30 and end plate 26 washes the cathode 51 and then enters aperture 42 to flow through the manifold apertures 41 and out of tube 47. Fluid which flows between end plate 27 and the lowermost membrane 30 washes the anode 52 and then enters aperture 44 to flow through the aligned manifold apertures 43 and pass from container 20 through tube 50. Fluid which flows from the stack through the cells marked D2 is further diluted and enters the internal fluid flow apertures 40 disposed below blocking gasket 34 to flow through the aligned manifold apertures 37 and from the container 20 through tube 48. Thus tube 48 conducts the dilute or product stream from the electrodialysis stack. All the fluid entering the ends of the cells marked C flows to the internal fluid flow apertures 39 and then through the aligned manifold apertures 38 to pass from the electrodialysis stack through tube 49.

Figure 5:
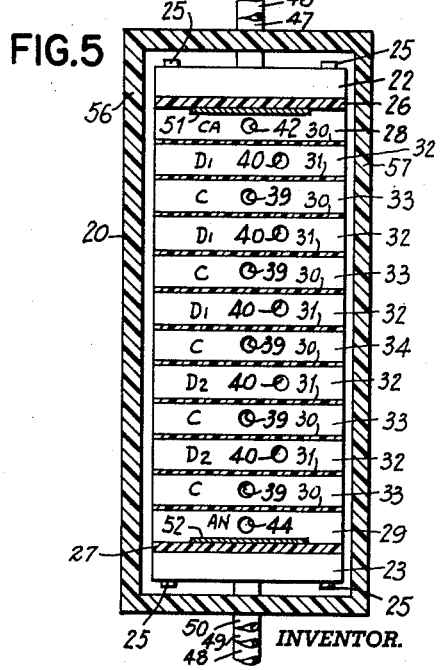
FIG. 5 is a section taken on line 5—5 of FIG. 1 showing a first embodiment of the invention.

As shown in FIG. 5, the side walls 56 and 57 of container 20 are disposed a distance apart substantially equal to the width of the end plates 26 and 27 and the gaskets 30 and 31. Because fluid flow generally follows the course of least resistance, there is little or no cross leakage of significance between the concentrating cells, the first pass diluting cells, the second pass diluting cells, the cathode compartment or the anode compartment which are respectively designated C, D1, D2, CA and AN.

Figure 7:
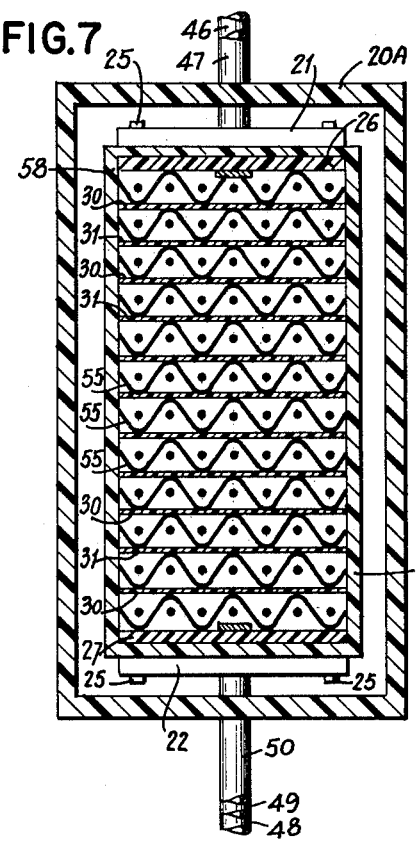
FIG. 7 is a section taken on line 5—5 of FIG. 1 showing a second embodiment of the invention.

Referring now to FIG. 7, it may be seen that the second embodiment of this invention is substantially the same as the first embodiment except that the container 20A is made considerably wider. A long rectangular plastic sheath 58 extends completely about those portions of end plates 26 and 27 and membranes 30 and 31 which extend beyond the end blocks 21 and 22. The plastic sheath 58 holds the end plates 26 and 27 and the membranes 30 and 31 close together about the screen spacers 55 and it lies close to the ends of the membranes 30 and 31 to prevent cross leakage between adjacent cells.

Figure 8:
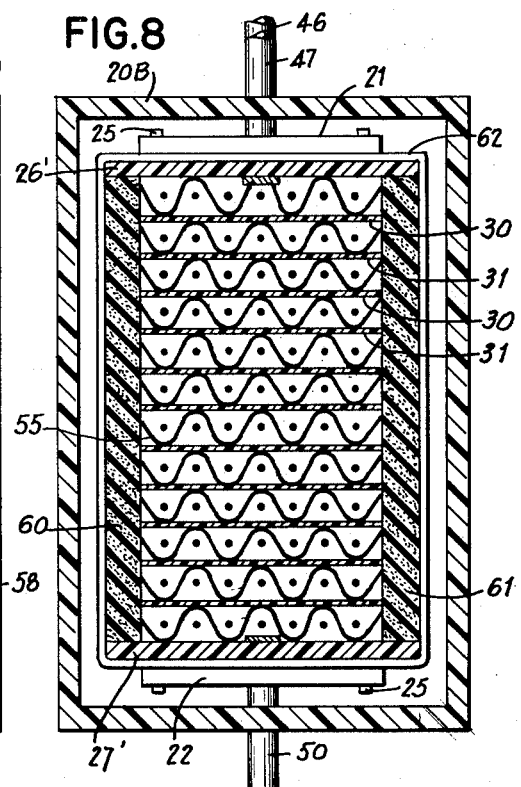
FIG. 8 is a section taken on line 5—5 of FIG. 1 showing a third embodiment of the invention.

Referring now to FIG. 8, it may be seen that the third embodiment of this invention has a still wider container 20B. Above and below the membranes 30 and 31 and the interspersed screen spacers 55 there are disposed the wider end plates 26′ and 27′ between the end blocks 21 and 22. On either side of the membranes 30 and 31 and the screen spacers 55 there are disposed between the end plates 26′ and 27′ the sponge elements 60 and 61. These sponge elements 60 and 61, as well as the end plates 26′ and 27′, the membranes 30 and 31 and the screen spacers 55 are held together by means of elastic bands 62 which pass about the end plates 26′ and 27′ and the sponge elements 60 and 61. Several of the elastic bands 62 may be placed along the length of the electrodialysis stack beyond the end blocks 21 and 22 to hold these elements in their proper relationship. The sponge elements 60 and 61 bound the flow paths between the membranes 30 and 31 and prevent any significant cross leakage between adjacent cells.

Figure 9:
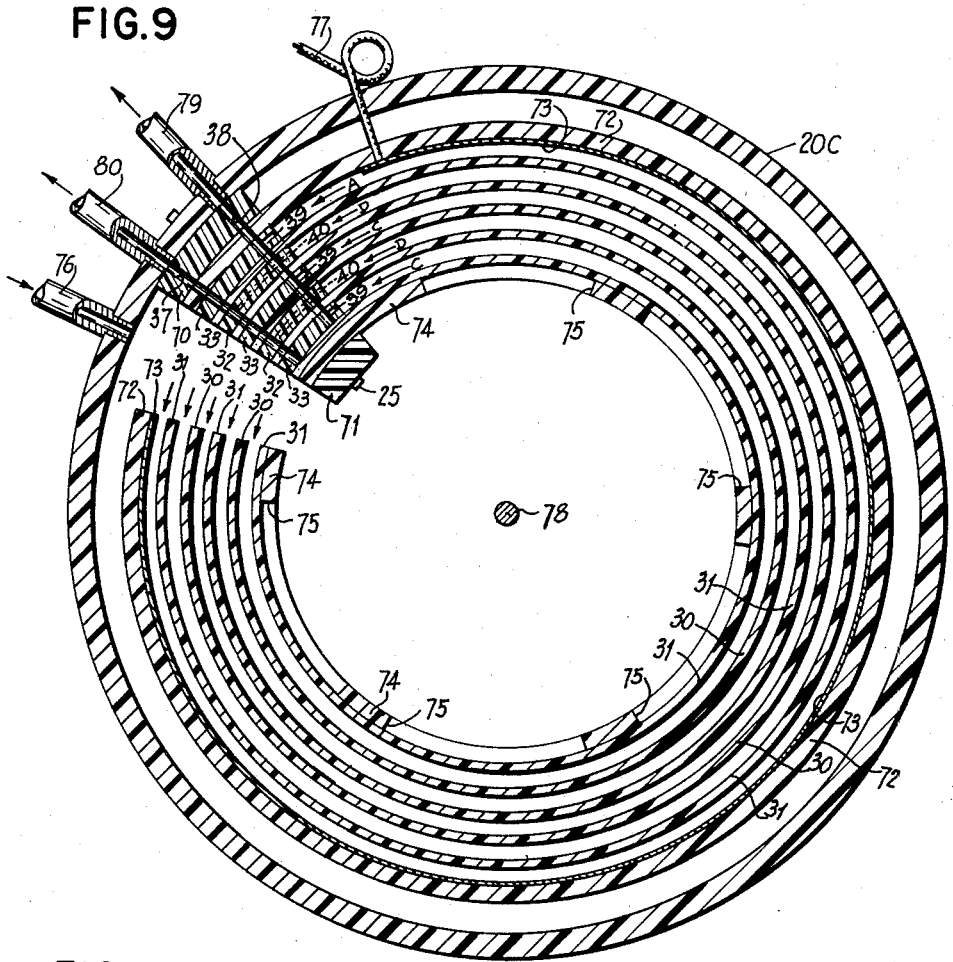
FIG. 9 is a horizontal section through a fourth embodiment of this invention with the screen spacers removed.

FIG. 9 shows a fourth embodiment of this invention which is somewhat similar to the first embodiment except that the electrodialysis stack is placed in a flat cylindrical container 20C and the membranes 30 and 31 are curved within the inside of the wall of container 20C. As shown, the ends of membranes 30 and 31 are held between gaskets 32 and 33 which are clamped between end blocks 70 and 71 by means of the bolts 25. The gaskets 32 and 33, the end block 70 and the membranes 30 and 31 contain the manifold apertures 37 and 38 as they were described in the first embodiment of the invention. The gaskets 32 contain the internal fluid flow apertures 40 which communicate between the manifold apertures 37 and the front faces of the gaskets 32. The gaskets 33 contain the internal fluid flow channels 39 which communicate between the aligned manifold apertures 38 and the front faces of gaskets 33. It is to be noted that the outermost gasket 33 serves as an electrode compartment forming gasket in this embodiment of the invention.

Disposed between gasket 33 and end block 70 is the curved end plate 72 which has the electrode 73 fixed to its inner surface. An inner end plate 74 is clamped between end block 71 and the innermost membrane 31. End plate 74 contains several large central openings 75. Screen spacers 55 (not shown) extend between the membranes 30 and 31 beyond the gaskets 32 and 33. The end plates 72 and 74 may be held together by elastic bands (not shown) or any other suitable means. Cross leakage between adjacent cells may be prevented by any suitable means such as those which have been described for the first three embodiments of the invention.

This fourth embodiment of the invention operates as follows. Fluid to be treated is introduced into container 20C through tube 76. This fluid then enters between the open ends of adjacent membranes to travel almost completely around within container 20C and enter the gaskets 32 and 33.

A lead 77 extends through an outer wall of container 20C and through the end plate 72 to contact electrode 73. Another lead (not shown) extends from the end of the central electrode 78 through an end wall of container 20C. These electrodes are connected to a suitable source of electric current so that electrode 78 functions as a cathode and electrode 73 functions as an anode. Thus fluid flowing between the outermost membrane 31 and end plate 72 washes electrode 73 and enters the internal fluid flow aperture 39 to pass through the aligned manifold apertures 38. Fluid passing between alternate pairs of membranes 30 and 31 is concentrated so that these membranes define concentrating cells designated by the letter C. Interspersed cells are diluting cells designated by the letter D. Fluid passing through the concentrating cells enters the gaskets 33 through the internal fluid flow apertures 39 and then passes through the aligned manifold apertures 38 to join the electrode washing stream and flow from container 20C through tube 79. Meanwhile, fluid flowing through the diluting cells D enters the gaskets 32 through the internal fluid flow passages 40 which communicate with the aligned manifold apertures 37. The dilute stream then flows through the aligned manifold apertures 37 to flow from the electrodialysis stack and tank 20C through tube 80.

In this fourth embodiment of the invention which has been described, the dilute stream makes but a single pass through the stack; however, should it be desired, this fourth embodiment of the invention could just as easily be constructed so that the dilute stream makes two passes through the electrodialysis stack as was described for the first embodiment of the invention. Since the membranes 30 and 31 curl about the central electrode 78, a much smaller electrode 78 may be employed. This results in a considerable saving if platinum or other high cost electrode material is used.

A fifth embodiment of this invention may be constructed by taking an electrodialysis stack according to the first embodiment of this invention and placing it within a tank 20C. However, in this fifth embodiment of the invention, all the elements between the end plates 26 and 27 would not form a single turn within the tank 20C as shown in FIG. 9, but they would form a spiral which completed more than one revolution. In this fifth embodiment of the invention, a central electrode 73 may not be used. Two electrodes 51 and 52 as shown in FIG. 1 must be fixed to the inner surfaces of the end plates 26 and 27.

Figure 10:
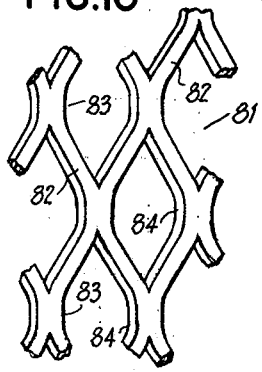
FIG. 10 is a top view of a piece of expanded sheet plastic spacer material.

In all the embodiments of this invention, the screen spacers 55 which are used may be conventional in form. However, to minimize cross leakage between adjacent cells, it is desirable to minimize the hydraulic resistance for fluid passing along the length of adjacent membranes. If expanded plastic screen material 81 as shown in FIG. 10 is used, superior results may be obtained if the material is oriented so that, as shown in FIG. 10, vertical flow takes place past it. Thus fluid will tend to flow along the length of the strands 82 of expanded material and follow the alignment of the high points 83 or the low points 84 of each strand.

Figures 11, 12:
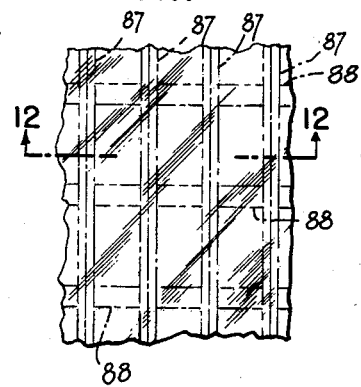
FIG. 11 is a top view of a fragment of a piece of flow controlling spacer material between two membranes.
FIG. 12 is a section taken on line 12—12 of FIG. 11.

Even better flow control between adjacent membranes may be obtained by using the spacer material 86 as shown in FIGS. 11 and 12. The spacer material 86, which is best formed of flexible plastic, consists of the longitudinal flow directing members 87 which are relatively narrow and have pointed upper and lower ends to contact the adjacent membranes 31 and 32. The flow directing members 87 are joined by the thin transverse members 88 which are formed integrally with the flow directing members 87 and extend from their central portions so as not to interfere with the flow at the membrane surfaces.

While several embodiments of this invention have been disclosed, it will nevertheless be understood that these are purely exemplary and that modification in the construction, arrangement and combination of parts may be made without departing from the spirit of the invention. While electrodialysis apparatus has been shown and described, this invention could be equally well applied to dialysis devices. For the purpose of this invention, electrodialysis is considered to be only a special case of dialysis.

What is claimed is:

1. An electrodialysis device comprising, in combination, an elongated fluid-tight container, elongated membranes within said container, adjacent membranes being anion and cation selective, gaskets interspersed between said membranes securing one end of each of said membranes, said membranes having unsecured portions extending beyond said gaskets and defining fluid flow paths between said membranes beyond said gaskets along said container, spacer means disposed between said unsecured portions of said membranes beyond said gaskets, means introducing fluid to be treated into said container, at least some of said membranes and said gaskets containing aligned manifold apertures with adjacent gaskets containing internal fluid flow apertures communicating between pairs of said membranes and different manifold apertures, means conducting a product and a waste stream from different manifold apertures, wall defining means disposed closely along the sides of said unsecured portions of said membranes to prevent cross-leakage between adjacent cells, and electrodes disposed within said container beyond said membranes and beyond said gaskets.

2. The combination according to claim 1 in which one of the manifold apertures in said gaskets and said membranes is blocked and in which said means introducing fluid to be treated into said container introduces the fluid to be treated into one side of the blocked manifold aperture.

3. The combination according to claim 1 wherein said membranes and said spacer means are substantially the same width as said container and extend across said container.

4. The combination according to claim 1 wherein said spacer means is formed from expanded material having integrally formed strands each having high and low portions, said strands being aligned with the flow paths defined by said membranes.

5. The combination according to claim 1 in which said spacer means comprises parallel longitudinal members aligned with the flow paths defined by said membranes, and thin cross members joining the centers of said longitudinal members.

6. The combination according to claim 5 wherein the tops and bottoms of said longitudinal members taper to an edge.

7. The combination according to claim 1 wherein said means disposed closely along the sides of said unsecured portions of said membranes comprises side walls of said container.

8. An electrodialysis device comprising, in combination, a fluid-tight container, elongated membranes curled within the periphery of said container, at least some of said membranes being ion selective, gaskets interspersed between said membranes clamping one end of said membranes, said membranes having unsecured portions extending beyond said gaskets and defining fluid flow paths between said unsecured portions of said membranes beyond said gaskets, means introducing fluid to be treated into said container, at least some of said membranes and said gaskets containing aligned manifold apertures with adjacent gaskets containing internal fluid flow apertures communicating between pairs of said membranes and different manifold apertures, means conducting a product and a waste stream from different manifold apertures, an electrode disposed about the outermost membrane within said container, and a central electrode disposed in the central portion of said container.

9. The combination according to claim 8 with the addition of an outer end plate disposed about said outer membrane and said first electrode, an inner end plate disposed within said innermost membrane, said inner end plate containing large apertures, and with the addition of means holding said end plates together.

10. An electrodialysis device comprising, in combination, a fluid-tight cylindrical container, elongated membranes within said container, at least some of said membranes being ion selective, gaskets interspersed between said membranes clamping one end of said membranes, said membranes having unsecured portions extending beyond said gaskets and defining fluid flow paths between said unsecured portions beyond said gaskets, means introducing fluid to be treated into said container, at least some of said membranes and said gaskets containing aligned manifold apertures with adjacent gaskets containing internal fluid flow apertures communicating between pairs of said membranes and different manifold apertures, spacer means between adjacent membranes, means conducting a product and a waste stream from different manifold apertures, electrodes disposed beyond said membranes and beyond said gaskets, end plates of nonconducting material extending at least the width of said membranes beyond said membranes and said electrodes, said membranes and said spacer means being wound into a spiral within said cylindrical container.

11. An electrodialysis device comprising, in combination, a fluid-tight container, membranes within said container, at least some of said membranes being ion selective, gaskets interspersed between said membranes and clamping one end of said membranes, said membranes having elongated unsecured portions extending beyond said gaskets and defining fluid flow paths between said elongated unsecured portions, means introducing fluid to be treated into said container, at least some of said membranes and said gaskets containing aligned manifold apertures and adjacent gaskets containing internal fluid flow apertures communicating between said membranes from different manifold apertures, means conducting a product and a waste stream from different manifold apertures in said gaskets, electrodes disposed within said container with membranes therebetween, spacer means disposed between said membranes beyond said gaskets, and a sheath extending about said electrodes, said membranes and said spacer means, said sheath having sides between which said membranes substantially extend.

12. An electrodialysis device comprising, in combination, a fluid-tight container, membranes within said container, at least some of said membranes being ion selective, gaskets interspersed between said membranes and clamping one end of said membranes, said membranes having elongated unsecured portions extending beyond said gaskets and defining fluid flow paths between said elongated unsecured portions, means introducing fluid to be treated into said container, at least some of said membranes and said gaskets containing aligned manifold apertures and adjacent gaskets containing internal fluod flow apertures communicating between said membranes from different manifold apertures, means conducing a product and a waste stream from different manifold apertures in said gaskets, electrodes disposed within said container with membranes therebetween, spacer means disposed between said membranes beyond said gaskets, resilient members within said container disposed alongside said membranes beyond said gaskets, and means securing said resilient members alongside said membranes.

13. The combination according to claim 12 wherein said resilient elements are of cellular material and wherein said resilient elements are held alongside said membranes by elastic bands placed about said resilient elements, said electrodes, said membranes and said spacer means.

References Cited in the file of this patent
UNITED STATES PATENTS

| | | |
|---|---|---|
| 2,741,595 | Juda | Apr. 10, 1956 |
| 2,758,083 | Van Hoek et al. | Aug. 7, 1956 |
| 2,878,178 | Bier | Mar. 17, 1959 |
| 2,881,124 | Tye | Apr. 7, 1959 |
| 2,894,894 | Kressman | July 14, 1959 |
| 2,948,668 | De Whalley et al. | Aug. 9, 1960 |
| 3,005,763 | Kollsman | Oct. 24, 1961 |